(12) United States Patent
Kostos

(10) Patent No.: US 11,821,215 B2
(45) Date of Patent: Nov. 21, 2023

(54) ARCHITECTURAL MATERIALS HAVING INTEGRATED ENERGY STORAGE SYSTEM

(71) Applicant: Spear Power Systems, Inc., Grandview, MO (US)

(72) Inventor: Jeffery T. Kostos, Lee's Summit, MO (US)

(73) Assignee: Spear Power Systems, Inc., Grandview, MO (US)

( * ) Notice: Subject to any disclaimer, the term of this patent is extended or adjusted under 35 U.S.C. 154(b) by 0 days.

(21) Appl. No.: 17/500,080

(22) Filed: Oct. 13, 2021

(65) Prior Publication Data

US 2022/0037732 A1 Feb. 3, 2022

Related U.S. Application Data

(63) Continuation of application No. 15/843,237, filed on Dec. 15, 2017, now abandoned.
(Continued)

(51) Int. Cl.
*E04F 13/08* (2006.01)
*H01M 10/48* (2006.01)
(Continued)

(52) U.S. Cl.
CPC ............ *E04F 13/08* (2013.01); *E04F 13/074* (2013.01); *E04F 13/083* (2013.01);
(Continued)

(58) Field of Classification Search
CPC ......... H01M 10/425; H01M 2010/4271; E04F 13/083; E04F 13/081; Y02B 10/14; H02S 40/38
See application file for complete search history.

(56) References Cited

U.S. PATENT DOCUMENTS 2,273,244 A 2/1942 Ambruster
3,460,305 A * 8/1969 Long .................. C04B 35/6313
52/249
(Continued)

FOREIGN PATENT DOCUMENTS

CN 101404298 4/2009
CN 104766898 7/2015
(Continued)

OTHER PUBLICATIONS

Office Action in corresponding Chinese Patent Application Serial No. 201780086368.6, dated Jun. 15, 2022 (English translation attached).
(Continued)

*Primary Examiner* — Babajide A Demuren
*Assistant Examiner* — Daniel J Kenny
(74) *Attorney, Agent, or Firm* — Hovey Williams LLP

(57) ABSTRACT

The present invention is generally directed to energy storage systems comprising manufactured architectural materials having electrical battery systems embedded therein. The manufactured materials are generally provided as architectural panels, such as panels useful for interior or exterior cladding for buildings, flooring, countertops, or stairs. The panels comprise at least one battery device or battery assembly that is over-formed by and/or bonded with the architectural material. In preferred embodiments, the panels are formed by flowing a viscous architectural material precursor around the battery device or assembly and curing the precursor so as to solidify the architectural material. The panels may be electrically connected in any number of various arrangements, which can be chosen based on the specific application for the energy storage system.

21 Claims, 7 Drawing Sheets

Related U.S. Application Data

(60) Provisional application No. 62/434,869, filed on Dec. 15, 2016.

(51) Int. Cl.

| | | |
|---|---|---|
| *H01M 50/227* | (2021.01) | |
| *H01M 50/229* | (2021.01) | |
| *H01M 50/251* | (2021.01) | |
| *H01M 50/298* | (2021.01) | |
| *H01M 50/222* | (2021.01) | |
| *E04F 13/074* | (2006.01) | |
| *H01M 6/50* | (2006.01) | |
| *H01M 10/0525* | (2010.01) | |
| *H01M 10/42* | (2006.01) | |
| *H01M 10/44* | (2006.01) | |
| *H02J 7/02* | (2016.01) | |
| *H02J 7/00* | (2006.01) | |
| *B29C 70/70* | (2006.01) | |
| *B29L 31/00* | (2006.01) | |

(52) U.S. Cl.
CPC ..... *H01M 6/5044* (2013.01); *H01M 10/0525* (2013.01); *H01M 10/425* (2013.01); *H01M 10/441* (2013.01); *H01M 10/48* (2013.01); *H01M 10/488* (2013.01); *H01M 50/222* (2021.01); *H01M 50/227* (2021.01); *H01M 50/229* (2021.01); *H01M 50/251* (2021.01); *H01M 50/298* (2021.01); *B29C 70/70* (2013.01); *B29L 2031/776* (2013.01); *E04F 13/081* (2013.01); *H01M 2220/10* (2013.01); *H02J 7/0013* (2013.01); *H02J 7/0024* (2013.01); *H02J 7/0047* (2013.01); *H02J 7/02* (2013.01)

(56) References Cited

U.S. PATENT DOCUMENTS

| | | |
|---|---|---|
| 4,012,686 A | 3/1977 | Heine |
| 5,236,371 A | 8/1993 | Matthis |
| 5,323,099 A | 6/1994 | Bruni et al. |
| 5,813,183 A | 9/1998 | Allley |
| 6,290,518 B1 | 9/2001 | Byrne |
| 6,593,723 B1 | 7/2003 | Johnson |
| 7,226,329 B2 | 6/2007 | Railey |
| 7,343,715 B2 | 3/2008 | Ito et al. |
| 8,026,633 B2 | 9/2011 | Fleisig et al. |
| 8,188,707 B2 | 5/2012 | McBurney |
| 8,807,267 B2 | 8/2014 | Iwata et al. |
| 8,832,469 B2 | 9/2014 | Sivertsen |
| 9,164,190 B1 | 10/2015 | Nagel et al. |
| 9,647,300 B2 | 5/2017 | Thramann et al. |
| 9,708,817 B2 | 7/2017 | Gestetner |
| 2004/0031219 A1 | 2/2004 | Banister |
| 2007/0194752 A1 | 8/2007 | McBurney |
| 2009/0174989 A1 | 7/2009 | Nagel et al. |
| 2009/0284219 A1 | 11/2009 | Meek |
| 2010/0175919 A1 | 7/2010 | Ellis |
| 2010/0195288 A1 | 8/2010 | Byrne |
| 2011/0080045 A1 | 4/2011 | Spikes |
| 2012/0090659 A1 | 4/2012 | Muchow et al. |
| 2013/0202949 A1 | 8/2013 | Bremer et al. |
| 2013/0240015 A1 | 9/2013 | Chaimovski et al. |
| 2013/0263442 A1 | 10/2013 | Favaretto |
| 2014/0021903 A1 | 1/2014 | Seiling |
| 2014/0025241 A1 | 1/2014 | Andou et al. |
| 2014/0242438 A1 | 8/2014 | Tanaka et al. |
| 2015/0038007 A1 | 2/2015 | Stone |
| 2015/0121779 A1* | 5/2015 | Arguelles ............... E04D 1/045 52/173.1 |
| 2015/0128518 A1 | 5/2015 | Knight et al. |
| 2015/0171484 A1 | 6/2015 | Lenardic et al. |
| 2015/0300583 A1 | 10/2015 | McCanless et al. |
| 2017/0121828 A1 | 5/2017 | Simpson et al. |
| 2017/0361727 A1 | 12/2017 | Miftakhov et al. |

FOREIGN PATENT DOCUMENTS

| | | |
|---|---|---|
| CN | 105906288 | 8/2016 |
| DE | 102013222605 | 5/2015 |
| DE | 102014117878 | 6/2015 |
| GB | 2494896 | 3/2013 |
| JP | 2000333370 | 8/2001 |
| JP | 2010037881 | 2/2010 |
| WO | 2016196488 | 12/2016 |

OTHER PUBLICATIONS

Office Action in corresponding European Patent Application Serial No. 17879754.4, dated May 31, 2022.
Notification of Reasons for Refusal in corresponding Japanese Patent Application No. 2019-553164, dated Jul. 6, 2021 (English translation attached).
Notification of Reasons for Refusal in corresponding Japanese Patent Application Serial No. 2019-553164, dated Dec. 8, 2020 (English translation attached).
Supplementary European Search Report in corresponding European Patent Application No. 17879754.4, dated Aug. 11, 2020.
International Search Report and Written Opinion in corresponding PCT/US2017/066668, dated Apr. 12, 2018.
Office Action in corresponding Chinese Patent Application No. 201780086368.6, dated Sep. 23, 2021 (English translation attached).
Office Action in corresponding U.S. Appl. No. 15/843,237, dated Feb. 14, 2019.
M3 Glass, https://web.archive.org/web/20160419212123 and http://www.m3glass.com/product/colorbak-back-painted-glass, 2016.
Tesla Powerwall, https://web.archive.org/web/20171119030948 and https://www.tesla.com/powerwall, 2017.
Office Action in corresponding U.S. Appl. No. 15/843,237, dated Dec. 10, 2019.
Office Action in corresponding U.S. Appl. No. 15/843,237, dated Aug. 4, 2020.
Tesla Powerwall, https://web.archive.org/web/20161118172822 and www.tesla.com/powerwall, 2016.
Office Action in corresponding U.S. Appl. No. 15/843,237, dated Dec. 3, 2020.
Office Action in corresponding U.S. Appl. No. 15/843,237, dated Apr. 13, 2021.

* cited by examiner

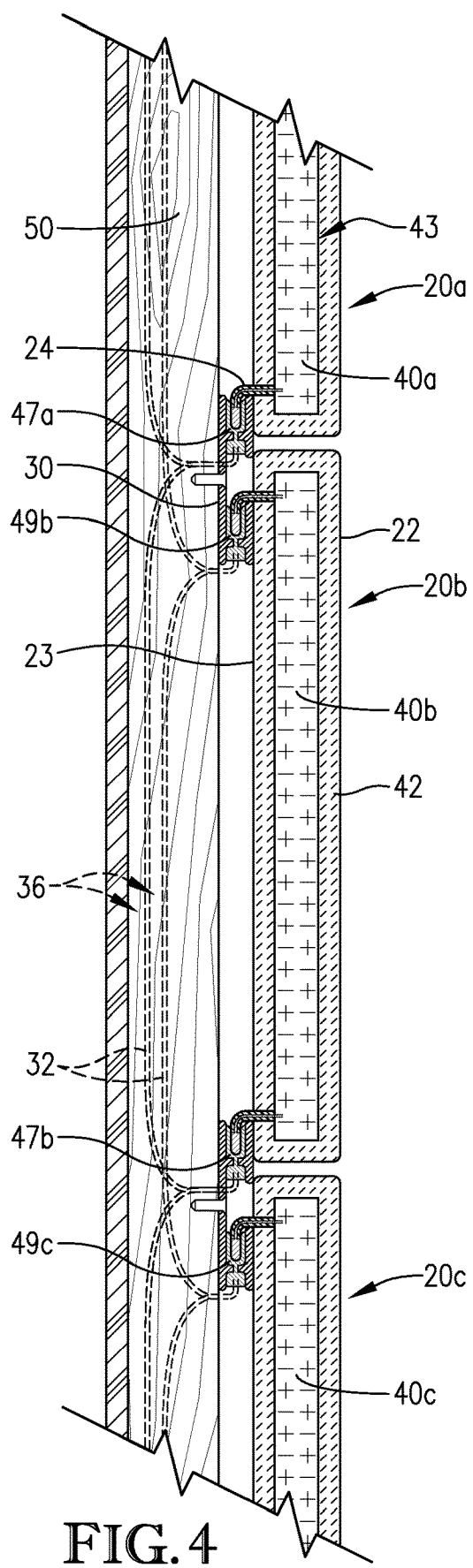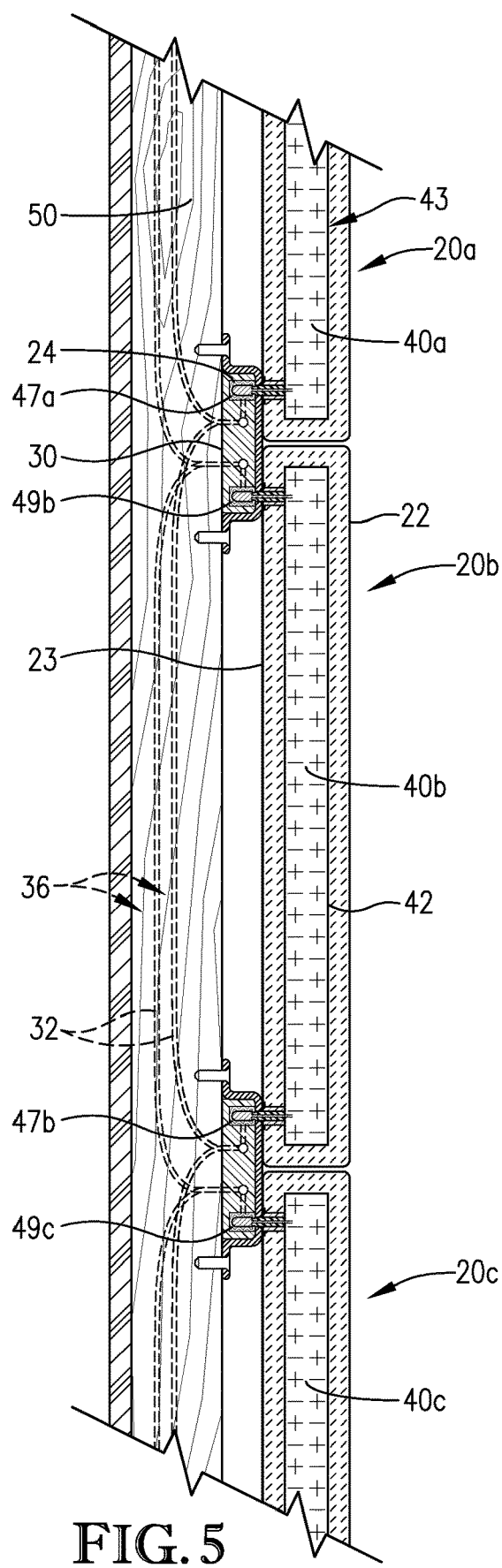
FIG. 4
FIG. 5

ARCHITECTURAL MATERIALS HAVING INTEGRATED ENERGY STORAGE SYSTEM

RELATED APPLICATION

The present application is a continuation of U.S. patent application Ser. No. 15/843,237, filed Dec. 15, 2017, which claims the benefit of U.S. Provisional Patent Application Ser. No. 62/434,869, filed Dec. 15, 2016, both of which are incorporated by reference herein in their entireties.

BACKGROUND OF THE INVENTION

Field of the Invention

The present invention is generally directed to architectural materials, such as interior and exterior cladding panels, flooring panels, countertops, or stairs, having integrated energy storage systems embedded therein.

Description of the Prior Art

Distributed energy storage systems are used in a number of applications, such as maintaining critical loads for security systems, providing backup power during a blackout, maintaining power quality for electrically sensitive equipment, providing surge protection to prevent damage to equipment, shifting electrical loads to avoid higher rates during peak usage, and providing storage and withdrawal for renewable energy generation systems. However, traditional energy storage systems have a number of drawbacks. For example, traditional systems are quite bulky and take up large amounts of space within a building. In many cases, entire rooms are dedicated to housing and maintaining traditional energy storage systems. Although they serve a functional purpose, traditional systems are typically aesthetically unappealing, and effort must be made to conceal the systems. Moreover, it is often time-consuming and costly to install and maintain traditional systems inside of buildings and homes. Finally, it has proven difficult to incorporate an energy storage solution into a building structure such that when connected, the basic building blocks of the battery (i.e., the battery cells) are more distributed throughout the structure thereby offering unparalleled safety advantages in the way of propagation protection should one cell or component initiate a thermal event. What is needed is a safe, invisible, or aesthetically appealing energy storage system that requires little or no dedicated storage space.

SUMMARY OF THE INVENTION

In one embodiment of the present invention, there is provided an architectural panel having an integrated energy storage system. The architectural panel comprises at least one battery assembly, which includes at least one battery cell, embedded within a manufactured architectural material. The at least one battery assembly comprises an exterior surface, and a majority of the exterior surface is over-formed by and/or bonded with the architectural material. The at least one battery assembly comprises electrical connectors operable to connect the at least one battery assembly with an electrical circuit that is external to the panel. There is also provided a wall structure comprising a plurality of the architectural panels.

In another embodiment, there is provided a method of providing power to a building, shelter, facility or any portion(s) thereof. The method comprises installing a wall onto a surface of the building comprising a plurality of architectural panels as described herein and connecting the plurality of architectural panels to an electrical circuit coupled with a source of electrical power. The method further comprises using the source of electrical power to charge the at least one battery cell of at least one of the panels, and selectively disconnecting the at least one panel from the source of electrical power and withdrawing electrical power from the at least one cell embedded within the at least one panel for use within the building.

In yet another embodiment, there is provided an architectural panel having an integrated energy storage system comprising at least one battery device. The battery device has an exterior surface a majority of which is in contact and/or bonded with a manufactured architectural material. The at least one battery device is embedded within the architectural material. The panel is formed by flowing a viscous architectural material precursor around the at least one battery device so as to cause the at least one battery device to become embedded within the viscous architectural material precursor, and curing the viscous architectural material precursor so as to solidify the viscous architectural material thereby forming the architectural material.

In still another embodiment, there is provided a method of manufacturing an architectural panel having an integrated energy storage system. The method comprises flowing a viscous architectural material precursor around at least one battery device so as to cause the at least one battery device to become embedded within the viscous architectural material precursor. The method further comprises curing the viscous architectural material precursor so as to solidify the viscous architectural material thereby at least partially encasing the battery device within the architectural material.

BRIEF DESCRIPTION OF THE DRAWINGS

FIG. 4 is an enlarged, cross-sectional view illustrating internal components according to another embodiment of the wall structure of FIG. 1;

FIG. 5 is an enlarged, cross-sectional view illustrating internal components according to another embodiment of the wall structure of FIG. 1;

DETAILED DESCRIPTION OF THE PREFERRED EMBODIMENT

Figure 1:
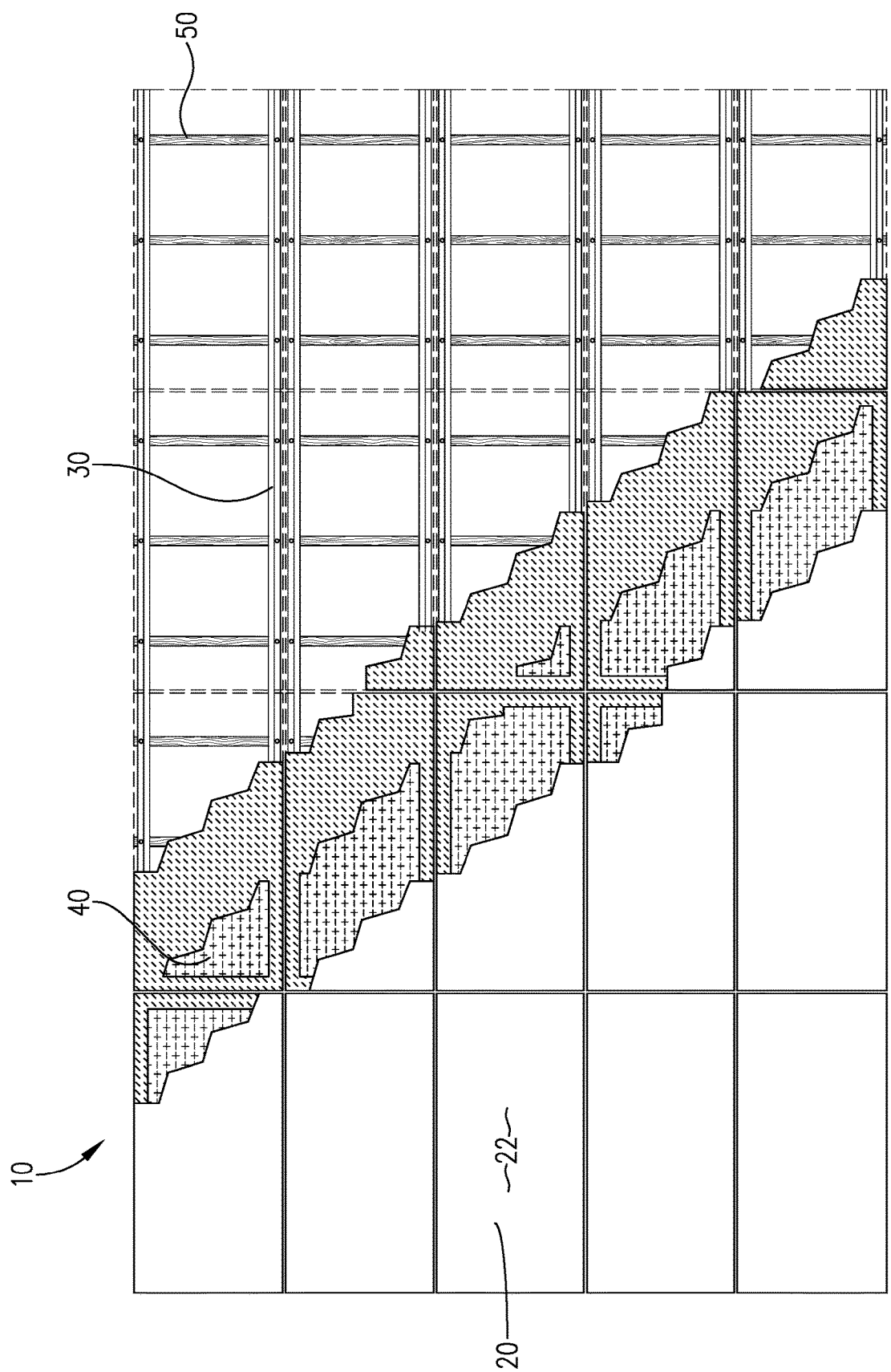
FIG. 1 is a fragmentary, front view of a wall structure comprising a plurality of architectural panels in accordance with one embodiment of the present invention.

Embodiments of the present invention are directed to architectural panels for use in an integrated energy storage system. The energy storage system is capable of storing an amount of chemical energy and converting the chemical energy to electrical energy when desired, for example, to supply electrical power to a building, shelter, or facility comprising the panels. In one or more embodiments, the energy storage system may comprise an individual panel, a plurality of panels, or an entire wall, floor, countertop, staircase, or any portion thereof. The energy storage system generally comprises at least one battery assembly embedded within one or more of the architectural panels. The battery assembly or battery assemblies can be used individually to provide isolated power, or may provide more extensive power through a wall structure, floor covering, countertops, or stairs comprising a plurality of the architectural panels. Referring to FIG. 1, the integrated energy storage system is provided as a wall structure 10 constructed from a plurality of architectural wall panels 20 secured to wall mounting structure 30. The plurality of panels comprise at least one battery assembly 40 structurally and electrically integrated within wall structure 10.

Panel 20 is generally constructed from a manufactured architectural material. As used herein "manufactured" architectural material refers to a man-made or processed material that does not exist in nature as such and configured to be used as an aesthetic wall covering, cladding, facade, flooring, countertops, or stairs. Manufactured architectural materials do not include raw or unprocessed building materials, such as unprocessed or unadulterated clay, stone, and wood. However, manufactured architectural materials may be formed from raw or natural materials that have been processed to create a material of different form, structure, and/or function than the raw or natural material from which it is comprised. For example, the manufactured architectural material may be formed by grinding a raw material into particles and mixing the ground material with binders or other synthetic materials. In certain embodiments, the manufactured architectural material comprises one or more members selected from the group consisting of synthetic resin materials, concrete, ceramics, quartz, glass, wood chips, sawdust, plaster, gypsum, fiberglass, and carbon fibers. The manufactured architectural material can be selected to provide preferred thermal characteristics for use in conjunction with battery assembly 40. In certain embodiments, the architectural material may possess a relatively low thermal conductivity which would operate to insulate the battery assembly from external heat sources, such as solar radiation. In other embodiments, the architectural material may possess a sufficient thermal conductivity permitting it to possess certain heat sink qualities serving to withdraw heat from the battery assembly. In either scenario, the architectural material may permit more efficient operation of the battery cells across a range of operating environments and conditions. In certain embodiments, the manufactured architectural material may have a thermal conductivity of about 0.05 to about 10 W/(m K), of about 0.1 to about 7.5 W/(m K), and more preferably from about 0.5 to about 5 W/(m K). The specific material used can depend on a number of factors, including aesthetic and functional considerations.

In certain preferred embodiments, panel 20 is manufactured by over-forming at least one battery device or assembly, as described herein, with a viscous architectural material precursor. As used herein, "over-forming" refers to the process of flowing a viscous architectural material precursor around the battery device so as to cause the device to become embedded within the viscous architectural material precursor. Over-forming also includes the concept of over-molding in which an object is inserted into a mold cavity, and a viscous material is introduced into the space between the mold and the object. The viscous architectural material precursor typically comprises a liquid or semi-liquid form of one or more of the manufactured architectural materials described herein. The viscous precursor may be treated (e.g., heated) prior to over-forming. In certain embodiments, viscous architectural material precursor is shaped as desired by being flowed into a mold. In such embodiments, the battery device or assembly may be suspended in the mold before the precursor is flowed, such that the precursor can be flowed around and contact a majority (greater than 50%), greater than 70%, greater than 90%, or greater than 95% of the battery device. In this way, the over-forming process utilized in embodiments of the present invention is similar to the over-molding process commonly used in the plastics industry. The viscous architectural material precursor is then cured so as to solidify the viscous architectural material and at least partially encase the battery device within a manufactured architectural material. In certain embodiments, the viscous architectural material precursor is cured by polymerizing a synthetic resin material within the precursor. However, it will be understood that the method of curing will depend on the chemistry of the precursor material. For example, viscous architectural material precursor may be cured by heating, cooling, and/or exposing the precursor to UV light.

Panel 20 generally has a surface 22 that is intended to be visible when panel 20 is secured to wall structure 10, and thus surface 22 is fabricated to aesthetic preference. In certain embodiments, surface 22 is configured to be weather resistant so as to form a part of a building exterior facade. As used herein, "weather resistant" means the surface is capable of withstanding the effects of wind, rain, or sun while retaining its appearance and integrity. Advantageously, a weather resistant surface 22 can function to prevent moisture from contacting and damaging the electrical components of battery assembly 40. In such embodiments, panel 20 is preferably constructed from a weather resistant architectural material, although a non-weather resistant material may also be used if panel 20 is treated, for example, with a weather resistant coating. In preferred embodiments, the panel is designed to conceal battery assembly 40, and thus the architectural material is opaque such that it does not transmit light and battery assembly 40 is not visible through the architectural material. Panel 20 may be constructed in various shapes and sizes and may be curved or flat. However, in preferred embodiments, panel 20 is in the shape of a rectangular prism having a thickness dimension that is less than about 25%, less than about 15%, less than about 10%, or less than 5% of either the length or width dimension. In particular embodiments, panel 20 is a relatively thin plate-like construct, as opposed to building materials designed to be structurally load bearing.

Figure 6:
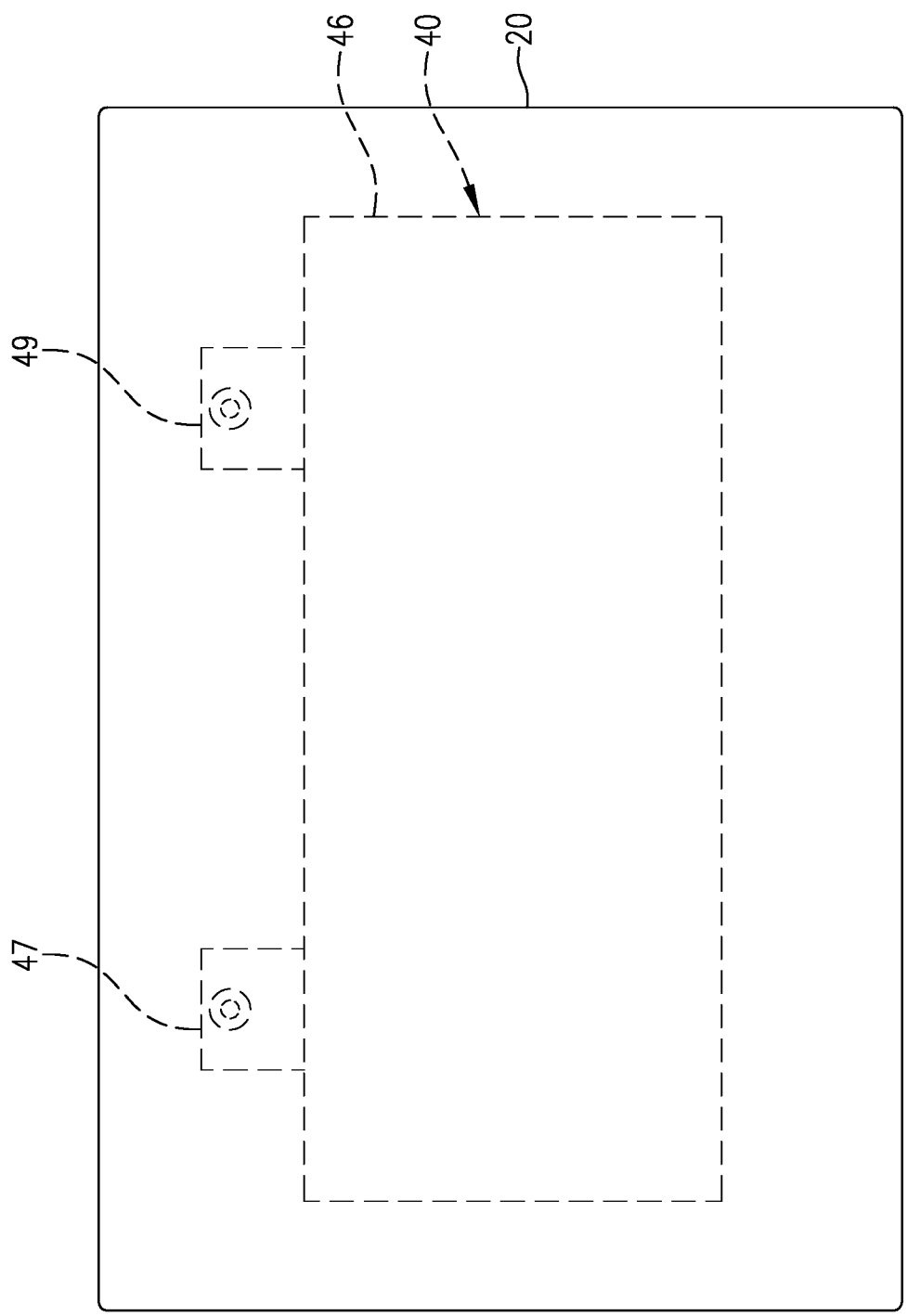
FIG. 6 is a front view of an architectural panel comprising a battery cell embedded therein, in accordance with one embodiment of the present invention.

As noted above, at least one battery assembly 40 is integrated within wall structure 10. As used herein, "battery assembly" refers to one or more of the various devices or components associated with the electrical energy storage and battery integration aspects of the invention, including any battery sleeves, battery casings or coverings, battery cells, electrical connections (e.g., wires), sensors, controllers, indicator lights, and safety components. In certain embodiments, battery assembly 40 does not include external circuitry, such as carried by the building structure, and power sources but generally comprises electrical connectors operable to connect battery assembly 40 with an electrical circuit that is external to panel 20. In certain embodiments, battery assembly 40 further comprises a battery device which includes at least one battery cell (as shown in FIG. 6), and preferably a plurality of battery cells.

Figure 7:
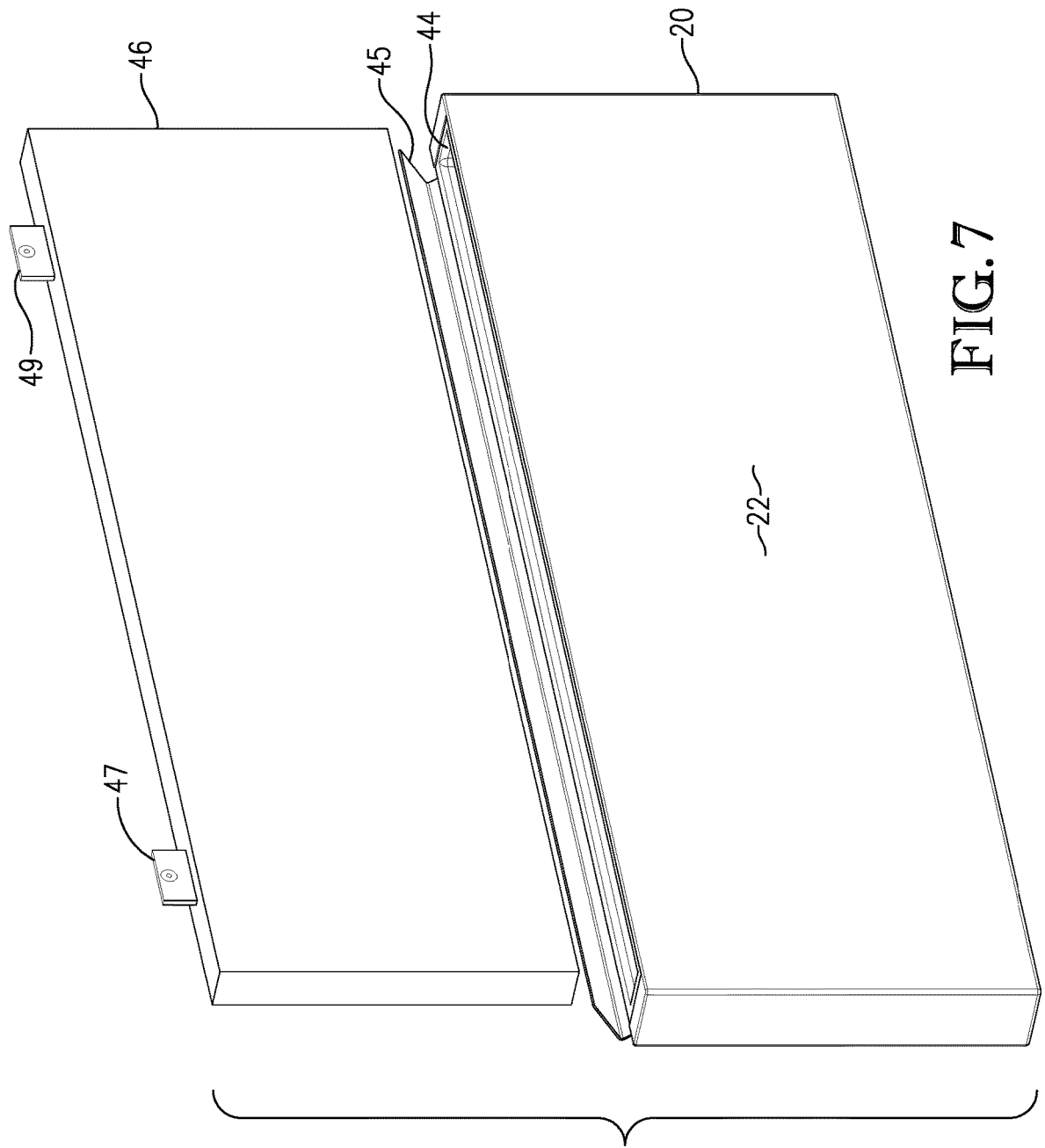
FIG. 7 is a perspective view illustrating an architectural panel having a battery device embedded therein and configured to removably receive a battery cell, in accordance with one embodiment of the present invention.
Figure 8:
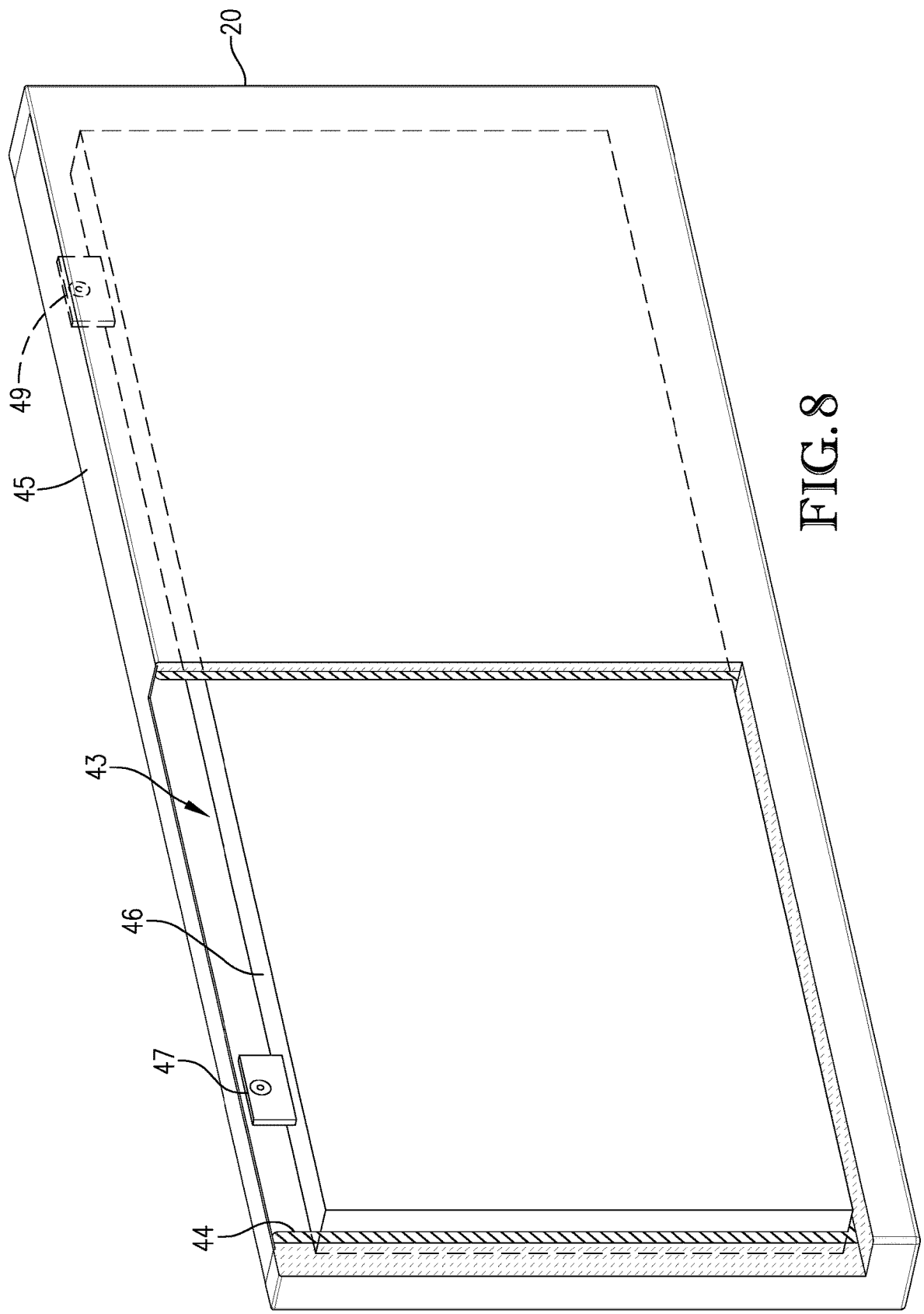
FIG. 8 is a perspective view illustrating a battery cell received within the battery device of the architectural panel according to the embodiment of FIG. 7.

In certain embodiments, battery assembly 40 comprises a battery device 43, which is embedded within panel 20. As used herein, "battery device" refers to one, some, or all of the components comprising battery assembly 40. For example, as shown in the embodiments of FIGS. 7 and 8, the battery device 43 may be a protective sleeve 44 in which a battery cell 46 is removably received. The protective sleeve 44 may comprise a lid 45 so as to fully encase or seal battery cell 46 within the sleeve 44. However, in certain other embodiments, the battery device 43 includes some or all of the components of battery assembly 40, including one or more battery cells, electrical connections, sensors, controllers, indicator lights, and protective components (e.g., protective sleeve).

Figure 9:
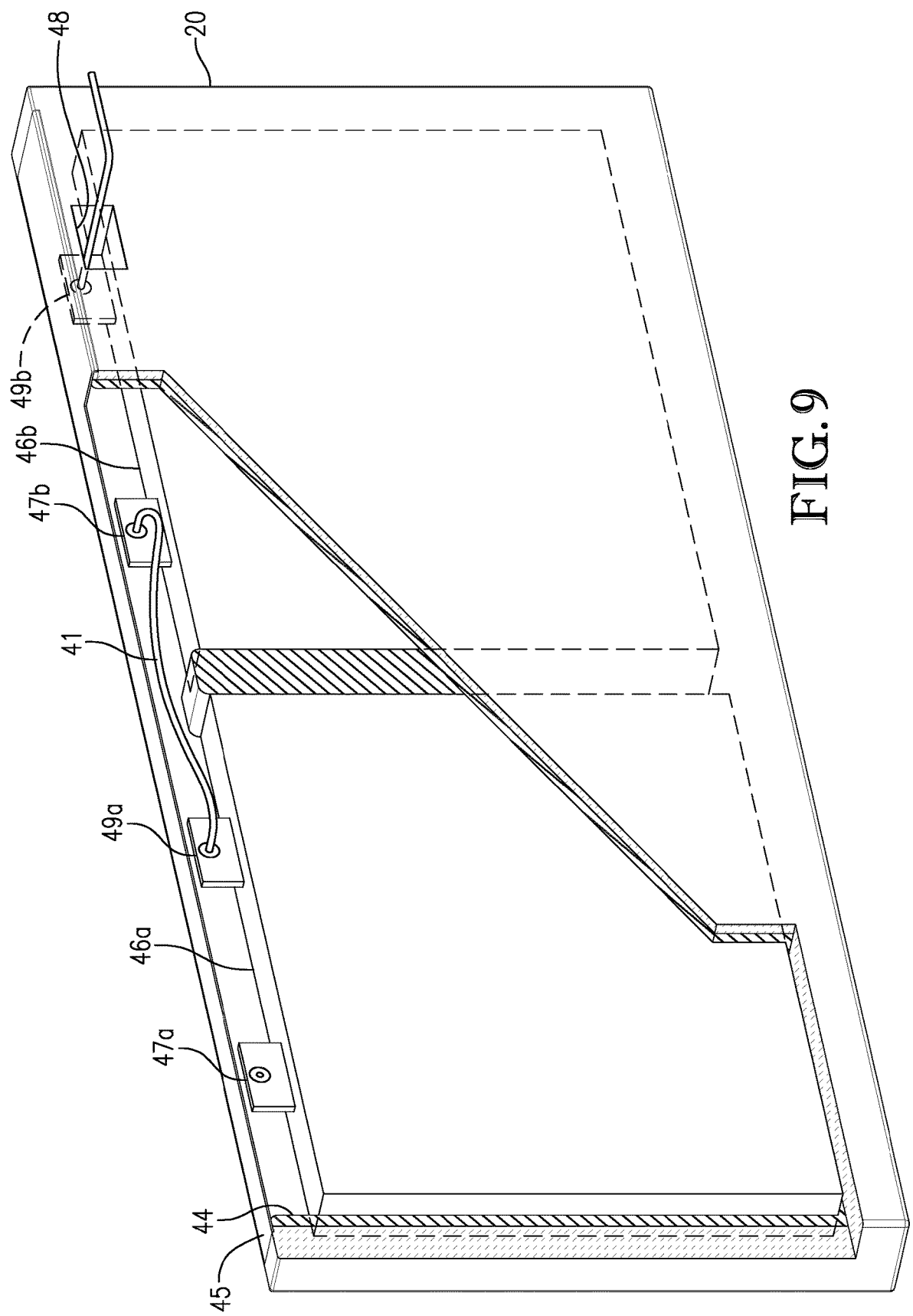
FIG. 9 is a back surface perspective view illustrating an architectural panel having two battery cells received within a battery device embedded in the panel, in accordance with one embodiment of the present invention.

As shown in the embodiments of FIGS. 2-5, the embedded battery device 43 (or battery assembly 40) comprises an exterior surface 42 that is over-formed by and/or bonded with the architectural material so that panel 20 forms a unitary construct, such that the battery device is inseparable from panel 20 without breaking or otherwise destroying the functionality of panel 20. In certain embodiments, a majority (greater than 50%), greater than 70%, greater than 90%, or greater than 95% of exterior surface 42 is over-formed by and/or bonded with and/or generally in direct contact with the architectural material. In certain embodiments, panel 20 comprises a plurality of battery devices and/or battery assemblies. Concurrently or alternatively, battery device 43 or assembly 40 (or the plurality of battery devices or assemblies) may each comprise a plurality of battery cells 46. For example, as shown in FIG. 9, two battery cells 46a and 46b (having corresponding cathodes 47a and 47b, and corresponding anodes 49a and 49b) may be received within sleeve 44 of panel 20 and connected in series via internal wiring 41. The plurality of battery assemblies, devices, and/or battery cells may be electrically connected in series and/or parallel, depending on the particular application for the energy storage system.

Figure 2:
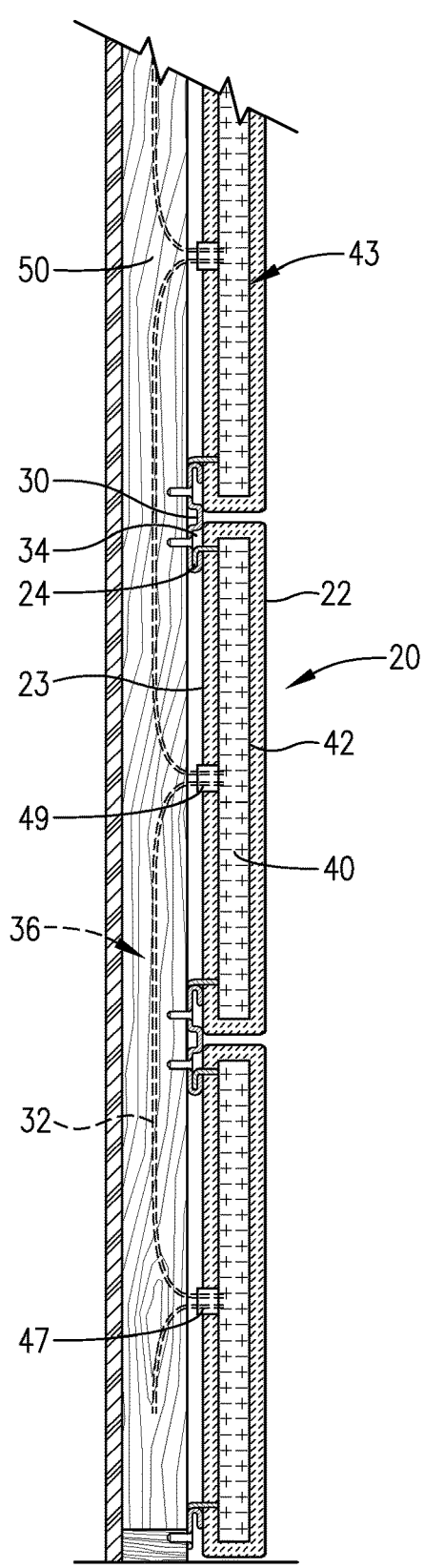
FIG. 2 is an enlarged, cross-sectional view illustrating internal components according to one embodiment of the wall structure of FIG. 1.
Figure 3:
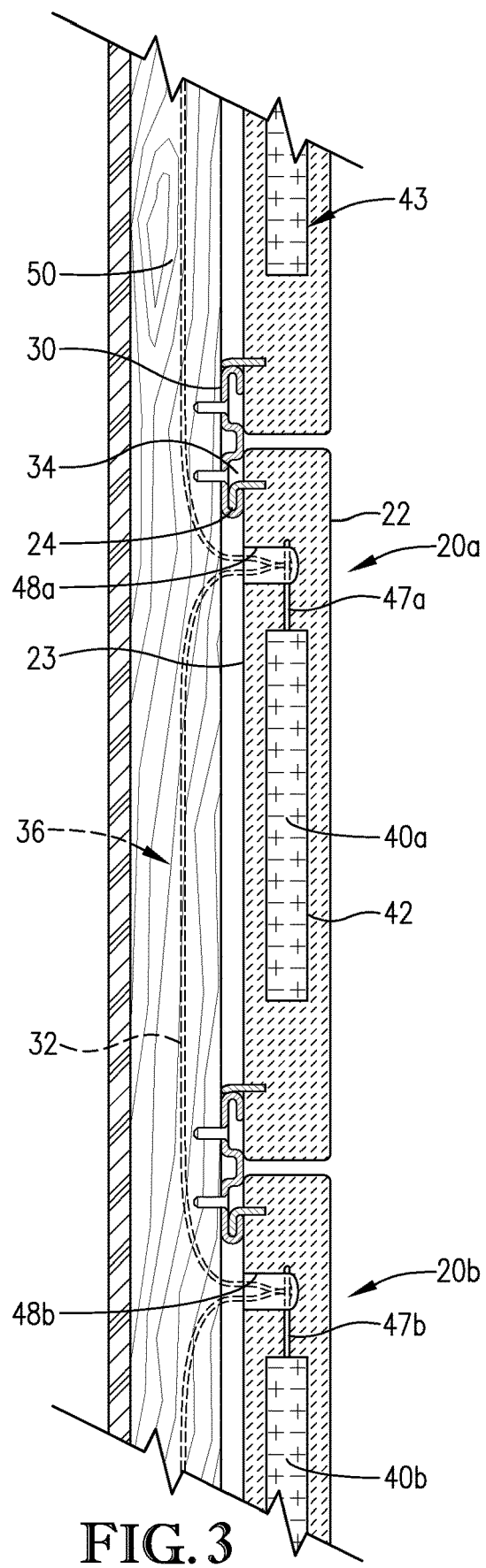
FIG. 3 is an enlarged, cross-sectional view illustrating internal components according to another embodiment of the wall structure of FIG. 1.

FIGS. 2-5 illustrate exemplary electrical arrangements for the plurality of battery assemblies, devices, and/or battery cells. However, it will be understood by those in the art that these arrangements are provided as examples only, and any other electrical arrangement known in the art may be utilized within the scope of the present invention. FIG. 2 shows the battery assemblies 40 of the plurality of panels 20 electrically connected in a series arrangement. Electrical wiring 32 is configured to connect a cathode 47 from a battery assembly of one panel to an anode 49 from another battery assembly of an adjacent panel. FIG. 3 shows the battery assemblies of the plurality of panels 20 electrically connected in a parallel arrangement. Electrical wiring 32 is configured to connect at cathode 47a from battery assembly 40a of panel 20a to another cathode 47b from battery assembly 40b of panel 20b. A similar configuration connects the anodes (not shown in FIG. 3) of panels 20a and 20b. In certain such embodiments, panel 20 comprises ports 48, such that electrical wiring 32 is connected to the cathodes 47a and 47b via ports 48a and 48b, respectively. FIGS. 4 and 5 show the battery assemblies 40 of the plurality of panels 20 electrically connected in a parallel arrangement. Electrical wiring 32 is configured to connect a cathode 47a from one battery assembly 40a of one panel 20a to another cathode 47b from a second battery assembly 40b of an adjacent panel 20b, and to connect an anode 49b from battery assembly 40b of panel 20b to another anode 49c from battery assembly 40c of panel 20c. In particularly preferred embodiments, battery assembly 40 and electrical wiring 32 are concealed from view. For example, in such preferred embodiments, portions of battery assembly 40 or electrical wiring 32 external to panel 20 will be connected through back surface 23 opposite of visible surface 22 (e.g., ports 48 on back surface 23).

The type of battery cell (or cells) can be selected for the particular application of the energy storage system. Battery cell chemistries are known and understood in the art, and any number of various battery cell chemistries may be used. For example, the at least one battery cell may be any primary or secondary cell chemistry. In certain embodiments, the at least one battery cell is selected from the group consisting of zinc-carbon, zinc-chloride, alkaline, nickel oxyhydroxide, lithium (including copper oxide, iron disulfide, manganese dioxide, carbon fluoride, and chromium oxide cathodes), mercury oxide, zinc-air, Zamboni pile, silver-oxide, and magnesium. In certain other embodiments, the at least one battery cell may also be a secondary cell chemistry selected from the group consisting of nickel-cadmium, lead-acid, nickel-metal hydride, nickel-zinc, silver-zinc, and lithium ion. Other possible battery cells include variants of lithium ion, lithium metal, lithium air, and solid state batteries. In particularly preferred embodiments, the battery cell is a lithium-ion battery cell. However, it will be understood that the battery cell chemistry used will depend on a number of factors, including desired capacity and voltage. Similarly, when more than one battery cell is used, the specific arrangement of battery cells will be chosen based on these factors. For example, when greater capacitance is desired, the battery cells will be electrically connected in parallel circuit. However, when greater voltage is desired, the battery cells will be electrically connected in series. The battery cells may be prismatic cells, cylindrical cells, pouch cells, or any combination thereof. The specific shape and dimension of the battery cells can be customized for the application. For example, prismatic cells provide the best space utilization, while cylindrical cells may provide simpler cooling options for high power battery systems. Pouch cells may also be used to allow for more flexibility in the design of the architectural material and battery system. In certain embodiments, panel 20 comprises electronic circuitry associated with battery assembly 30 that is operable to monitor and/or control at least one aspect of the battery cell status or operation. In preferred embodiments, this electronic circuitry is embedded within the architectural material.

In certain embodiments, panel 20 further comprises fastening elements 24 configured to secure panel 20 to wall mounting structure 30. Fastening elements 24 may be any of a variety of fasteners, and the specific design and configuration of fastening elements 24 will depend on various factors such as the size and weight of panel 20, whether wall structure 10 is an interior wall or exterior facade, and safety considerations for the particular application of the energy storage system. As illustrated in the embodiments of FIGS. 2-5, fastening elements 24 can be configured to be inserted into a receiving portion 34 of mounting structure 30 such that panel 20 is detachably connected to mounting structure 30. In certain embodiments, fastening elements 24 may serve to not only structurally secure panel 20 to mounting structure 30 but also to provide an electrical connection between an embedded portion of battery assembly 40 and electrical wiring 32 (see FIGS. 4 and 5). However, in certain other embodiments, fastening elements 24 do not provide an electrical connection for battery assembly 40 (see FIGS. 2 and 3). It will be understood by those in the art that the embodiments shown in FIGS. 2-5 are merely exemplary fastening mechanisms, and any number of other fastening mechanisms may be used so long as the chosen mechanism is capable of securing panel 20 to mounting structure 30.

Similarly, mounting structure 30 may be any of a variety of styles, and the specific design and configuration will depend on factors such as the size and weight of panel 20, whether wall structure 10 is an interior wall or exterior facade, and safety considerations. However, in certain embodiments, mounting structure 30 comprises rails and/or crossmembers affixed to a subwall structure 50, such as illustrated in FIGS. 1-5. As shown in FIGS. 4 and 5, in certain embodiments, mounting structure 30 comprises electrical circuitry 36 operable to supply power to and/or deliver power from the battery cells, for example, via fastening elements 24. In such embodiments, electrical circuitry 36 may be configured such that the plurality of panels 20 comprising wall structure 10 are connected in parallel or in series. Concurrently or alternatively, wall structure 10 is coupled with electronic circuitry (not shown, and separate from electrical circuitry 36) that is operable to monitor the status of and/or control at least one operational aspect of at least one battery cell contained within each panel 20.

The energy storage system of the present invention can be used to provide power to a building, shelter, facility, or structure (e.g., an architectural screen or fence to separate properties or boundaries) or any portion thereof. In certain embodiments, the method comprises installing wall structure 10 onto the surface of the building, for example in the form of interior or exterior cladding, although embodiments of the present invention may also be used to form a floor covering, ceiling, or other building surface. As best shown in FIG. 1, wall structure 10 comprises a plurality of panels 20. It will be understood that wall structure 10 may comprise a mixture of functional and non-functional panels, such that a plurality of the panels comprise a battery assembly, while some panels do not comprise a battery assembly (i.e., some panels are solely aesthetic). In preferred embodiments, panels 20 are installed by detachably securing the panels to mounting structure 30, for example, by using some variation of fastening elements 24. The plurality of panels 20 are connected to an electrical circuit, which may comprise electrical wiring 32 and circuitry 36, that is coupled with a source of electrical power. The source of electrical power may be a public utility (e.g., coal, natural gas-fired power plant, nuclear power plant, wind farm, solar farm, or hydroelectric) or a stand-alone power system (e.g., off-the-grid local solar, wind, or fossil fuel-powered generator). Regardless, the source of electrical power is used to charge at least one (or some, or all) battery cell within at least one (or some, or all) panel 20. When electrical energy distribution from the battery cells is desired, panel 20 is selectively disconnected from the source of electrical power and electrical power is withdrawn from the battery cell 46 embedded within panel 20 for use within the building. In certain embodiments, the same electrical circuit used for charging the battery cell(s) can also be used for conducting power withdrawn from cells for use within building. In such embodiments, the electrical circuit will typically comprise a control system for selectively distributing power to and from cells and/or for switching cells from parallel to series based upon demand.

I claim:

1. An architectural panel having an integrated energy storage system comprising at least one battery assembly, which includes at least one battery cell, embedded within an opaque manufactured architectural material, the architectural material comprising quartz and a polymerized synthetic resin, the at least one battery assembly comprising an exterior surface, greater than 90% of the exterior surface being over-formed by, and contacting, the opaque architectural material such that the at least one battery assembly is not visible through the opaque architectural material, the at least one battery assembly comprising electrical connectors operable to connect the at least one battery assembly with an electrical circuit that is external to the panel.

2. The architectural panel of claim 1, wherein the panel further comprises electronic circuitry associated with the at least one battery assembly that is operable to monitor and/or control at least one aspect of the battery cell status or operation.

3. The architectural panel of claim 2, wherein the electronic circuitry is embedded within the architectural material.

4. The architectural panel of claim 1, wherein the panel further comprises fastening elements configured to secure the panel to a wall mounting structure.

5. The architectural panel of claim 1, wherein the panel comprises a plurality of battery assemblies.

6. The architectural panel of claim 1, wherein the battery assembly comprises a plurality of battery cells electrically connected in series or in parallel.

7. The architectural panel of claim 1, the architectural panel having at least one surface that is configured to be weather resistant.

8. The architectural panel of claim 1, wherein the architectural panel comprises a thickness dimension that is less than 25% of either the length or width dimension of the panel.

9. The architectural panel of claim 1, wherein the battery assembly comprises the electronic circuitry associated with the at least one battery cell that is operable to monitor and/or control at least one aspect of the battery assembly status or operation.

10. A wall structure comprising a plurality of architectural panels according to claim 1.

11. An architectural panel having an integrated energy storage system comprising at least one battery device having an exterior surface a majority of which is in contact with a manufactured architectural material, the architectural material comprising quartz, the at least one battery device being embedded within the architectural material, the panel being formed by an over-forming process comprising flowing a viscous architectural material precursor comprising the quartz and a synthetic resin around the at least one battery device so as to cause the at least one battery device to become embedded within the viscous architectural material precursor, and curing the viscous architectural material precursor by polymerizing the synthetic resin so as to solidify the viscous architectural material thereby forming the architectural material.

12. The architectural panel according to claim 11, wherein the at least one battery device comprises at least one battery cell.

13. The wall structure according to claim 11, wherein the plurality of panels is detachably secured to mounting structure.

14. The wall structure according to claim 13, wherein the mounting structure comprises rails and/or crossmembers affixed to a subwall structure.

15. The wall structure according to claim 11, wherein the wall structure forms an exterior or interior cladding.

16. A method of providing power to a building, shelter, facility, structure, or any portion thereof comprising:
- installing a wall onto a surface of the building, shelter, facility, structure, or any portion thereof, the wall comprising a plurality of architectural panels according to claim 1;
- connecting the plurality of architectural panels to an electrical circuit coupled with a source of electrical power;
- using the source of electrical power to charge the at least one battery cell of at least one of the panels;
- selectively disconnecting the at least one panel from the source of electrical power and withdrawing electrical power from the at least one cell embedded within the at least one panel for use within the building, shelter, facility, structure, or any portion thereof.

17. The method of claim 16, wherein installation of the wall comprises detachably securing the plurality of architectural panels to a mounting structure.

18. The method of claim 17, wherein installation of the wall comprises forming an interior or exterior cladding of a building.

19. The method of claim 16, the source of electrical power being a public utility or a stand-alone power system.

20. The method of claim 16, wherein the electrical circuit used for charging the at least one battery cell can also be used, at least in part, for conducting power withdrawn from cells for use within the building, shelter, facility, structure, or any portion thereof.

21. The method of claim 20, wherein the electrical circuit used for charging comprises a control system for distributing power to and from cells and/or for switching cells from a parallel arrangement to a series arrangement based upon demand.

* * * * *